UNITED STATES PATENT OFFICE.

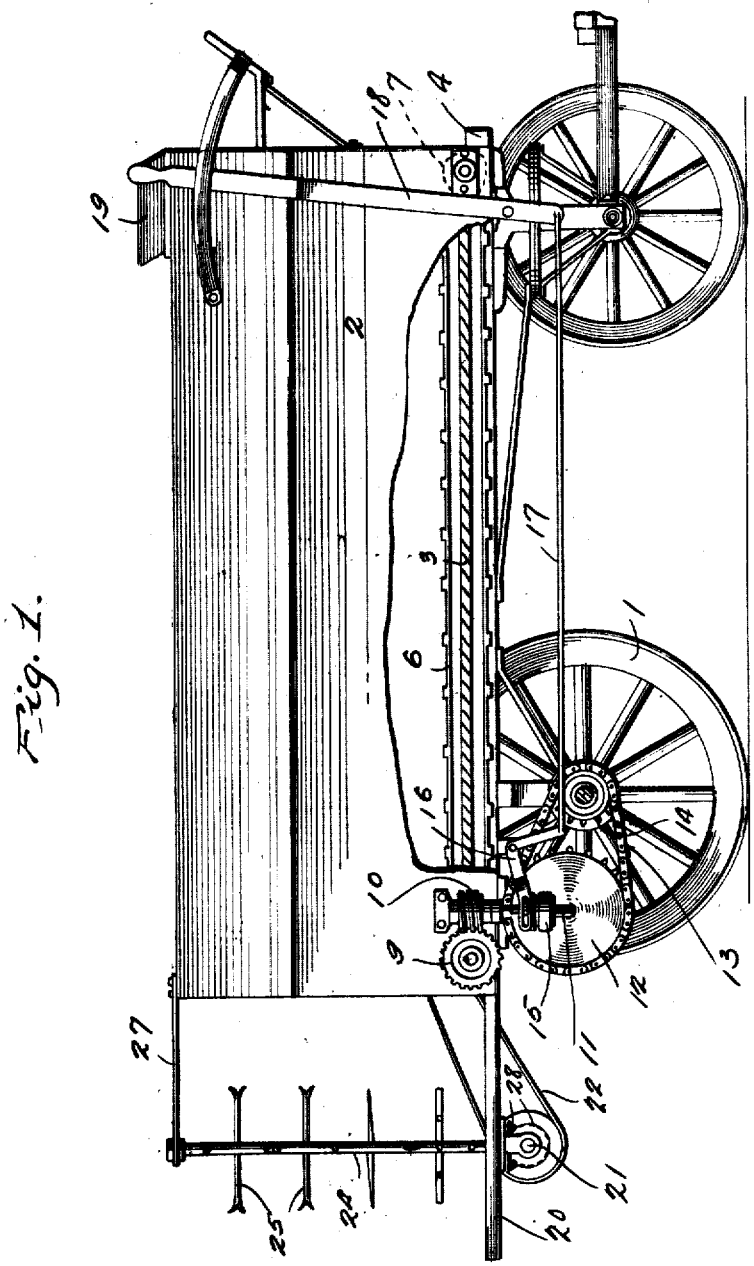

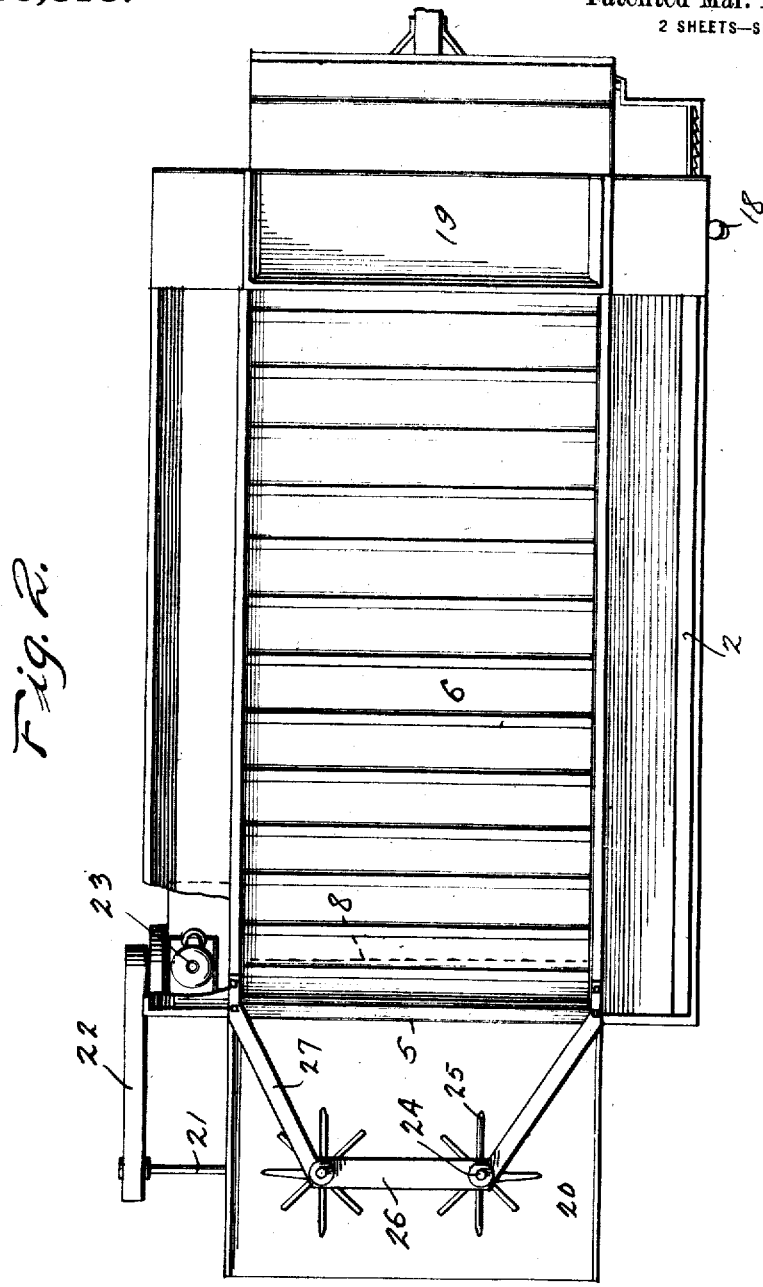

FRED C. NIRIDER, OF LOOGOOTEE, ILLINOIS.

DISTRIBUTING-MACHINE.

1,333,818.　　　Specification of Letters Patent.　　Patented Mar. 16, 1920.

Application filed November 12, 1918. Serial No. 262,181.

*To all whom it may concern:*

Be it known that I, FRED C. NIRIDER, citizen of the United States, residing at Loogootee, in the county of Fayette and State of Illinois, have invented certain new and useful Improvements in Distributing-Machines, of which the following is a specification.

This invention is a machine for distributing manure, straw, limestone, phosphate and the like.

Broadly, the idea is to employ a wagon body with a rearwardly moving carrier along its bottom, a pan on which the material is dropped, and rapidly revolving agitators or distributers within said pan for throwing the material over a path from twenty to thirty feet wide as the vehicle progresses.

Specifically, the invention includes mechanism for carrying out this general idea, particularly for driving the carrier from the hub of one of the wagon wheels, with means for varying the connection and therefore the speed of the carrier, and for driving the distributer or agitator from a small gasolene engine carried on the wagon body, so that the two are entirely independent.

Details are set forth below, and attention is drawn to the drawings, wherein—

Figure 1 is a side elevation partly broken away and

Fig. 2 is a top plan.

Mounted on wheels 1 is a wagon body of appropriate shape and preferably having inwardly inclined sides 2, and around its bottom 3 between its front and rear sills 4 and 5 moves the apron 6 of the endless carrier, traveling over rollers 7 and 8. One end of the rear roller is connected with one of the main wheels 1 by appropriate means including speed changing mechanism, and in the drawings I have shown the roller as having a worm gear 9 engaged by a worm 10 on the upper end of a shaft 11 passing down alongside a disk 12, the disk being connected with the wheel 1 by appropriate means such as the belt 13 passing around a sprocket 14 on the hub although of course other connections could be employed. On the lower portion of the shaft is splined a friction wheel 15. The friction wheel is movable vertically by any appropriate mechanism such as the bell-crank lever 16 having one arm connected with its hub, and the other arm connected with a rod 17 leading forward to a lever 18 adjacent the driver's seat 19. By manipulating this lever the friction wheel can be set at various distances from the center of the disk, and therefore its speed of rotation adjusted. Rotation of the shaft 11 is communicated through the worm mechanism to the rear roller 8 and the apron 6 is therefore caused to move constantly to the rear over the bottom 3 of the wagon body.

Underlying and secured to the rear sill 5 is a pan 20 preferably of sheet metal and with or without upstanding sides as indicated. Mounted transversely beneath this pan is a shaft 21 belted at its left end as at 22 to a small motor 23 carried on a shelf alongside the wagon body. Rising through holes in the pan are two upright shafts 24, each bearing a number of radiating arms 25 of any appropriate type and length, and the upper ends of these shafts are mounted in bearings in a bar 26 which is connected by rods 27 with the sides 2 of the wagon body. The lower ends of the upright shafts are connected by gears 28 with the shaft 21 from which the shafts receive their motion when the motor is set at work and therefore this mechanism is driven entirely by the motor, independent of the progress of the machine.

When now a team or a tractor is hitched to the vehicle and the same moves forward, turning of its rear wheels drives the disk and through the adjustable connection moves the apron to the rear. Therefore, whatever material is contained within the wagon body is carried slowly to the rear and over the rear sill 5 and dropped onto the pan 20. Meanwhile the motor drives the power shaft 21 which in turn communicates motion to the upright shafts 24 whose arms rotate rapidly and distribute the material over a path from twenty to thirty feet wide according to the proportion of parts and the rapidity of action. It is obvious that the speed of the carrier may be adjusted by the mechanism described, although the latter is only typical of one form of connection which I might employ. It is also obvious that the speed or vigor of the distributing mechanism may be adjusted by regulating the speed of the motor. Thus I throw onto the tractor or horses only the labor of moving the wagon forward and its contents to the rear, while the greatest part of the labor which is the distributing of the material is thrown onto the motor. The material may obviously be any that is desired, and I do not wish to be limited in this respect.

The foregoing description and the drawings have reference to what may be considered the preferred, or approved form of my invention. It is to be understood that I may make such changes in construction and arrangement and combination of parts, materials, dimensions, et cetera, as may prove expedient and fall within the scope of the appended claim.

Having thus fully described my invention, what I claim as new and desire to secure by Letters Patent is:—

In a device of the character described, the combination of a body having a flanged pan extending from one end thereof, a substantially semi-looped bar carried by said body at a distance above said pan, said bar comprising a body portion having rods extending at oblique angles therefrom, the corners thus formed provided with bearings, upright shafts projecting through said pan and having their upper ends journaled in said bearings, radiating arms carried by said shafts, a shaft extending below and parallel to said pan, means for driving said last mentioned shaft at a high rate of speed, beveled gears carried by said last mentioned and first mentioned shafts meshing with each other, whereby when the last mentioned shaft is driven, rotary motion will be imparted to the first mentioned shaft for moving said arms in circles.

In testimony whereof I affix my signature in presence of two witnesses.

FRED C. NIRIDER.

Witnesses:
 FLOYD E. BULLINGTON,
 CHAS. L. FOGLER.